United States Patent [19]

Henry

[11] Patent Number: 4,754,452

[45] Date of Patent: Jun. 28, 1988

[54] OPTICAL LOCAL AREA NETWORK USING A COMMON OPTICAL CARRIER WITH SEPARATE USER ANGLE MODULATION

[75] Inventor: Paul S. Henry, Holmdel, N.J.

[73] Assignee: American Telephone and Telegraph Company, AT&T Bell Laboratories, Murray Hill, N.J.

[21] Appl. No.: 906,136

[22] Filed: Sep. 11, 1986

[51] Int. Cl.$^4$ ............................................. H04J 3/02
[52] U.S. Cl. ........................................... 370/85; 370/4
[58] Field of Search ...................... 370/85, 86, 89, 95, 370/4

[56] References Cited

U.S. PATENT DOCUMENTS

| | | | |
|---|---|---|---|
| 3,809,815 | 5/1974 | Reed et al. | 179/15 FD |
| 3,809,816 | 5/1974 | Reed et al. | 179/15 FD |
| 4,161,786 | 7/1979 | Hopkins et al. | 370/95 |
| 4,266,850 | 5/1981 | Burns | 350/96.14 |
| 4,267,590 | 5/1981 | Bosotti | 370/3 |
| 4,307,937 | 12/1981 | Gordon | 350/96.29 |
| 4,481,626 | 11/1984 | Boggs et al. | 370/85 |
| 4,510,599 | 4/1985 | Ulug | 370/85 |
| 4,545,075 | 10/1985 | Miller et al. | 155/612 |

OTHER PUBLICATIONS

Wong et al., NTC'80, Houston, Tex., vol. 2, pp. 37.3/1-7.
Taylor, Fiber Optics Communications, Artech House, Inc., Dedham, Ma., 1983, pp. 14-16, 219-220, 221-222.
Stern, ICC'84, Amsterdam, Holland, vol. 2, pp. 884-887.
Finley, Jr., IEEE Comm. Mag., vol. 22, No. 8, Aug. 1984, pp. 22-35.
J. C. Palais, 1986 Handbook and Buyers Guide, vol. VII, Info Gatekeepers Inc., pp. 21-35, 44, 47.
Davies et al., First European Conf. Optical Fiber Comm., Sep. 16-18, 1975, London, England, pp. 165-167.

Primary Examiner—Douglas W. Olms
Assistant Examiner—James E. Busch
Attorney, Agent, or Firm—Erwin W. Pfeifle

[57] ABSTRACT

The present invention relates to a multiple-user communication system wherein one carrier source is shared by a cascade of users of the system. More particularly, the present communication system uses a single carrier propagating along the system's transmissin medium onto which each user directly impresses the associated data or communication signal destined for another user preferably using either subcarrier angle modulation (phase or frequency) or TDM techniques for intensity or angle modulation. In the present system using subcarrier angle modulation, each user can either transmit or receive at a fixedly assigned or selectively assigned subcarrier channel, which is different from the subcarrier channel assigned to each of the other users. Where TDM techniques are used, the communication signal from a user can be directly impressed on the single carrier using intensity or phase modulation. With such communication system, amplifiers can be liberally used along the bus with no inter-modulation distortion since the amplifiers see a constant envelope signal. The use of ampmlifiers solves the problem of excessive signal loss incurred when multiple users tap into or out of, for example, an optical fiber bus.

11 Claims, 3 Drawing Sheets

OPTICAL LOCAL AREA NETWORK USING A COMMON OPTICAL CARRIER WITH SEPARATE USER ANGLE MODULATION

TECHNICAL FIELD

The present invention relates to an optical Local Area Network (LAN) which uses a single optical carrier onto which each user of the network impresses the associated data using either separate subcarrier angle modulation (phase or frequency modulation), or TDM techniques for intensity or angle modulation. More particularly, the present technique allows amplifiers to be used along the bus, thereby solving the problem of excessive signal loss when multiple users tap into or out of a fiber bus. Each amplifier of the LAN sees a constant envelope signal to avoid any intermodulation distortion caused by nonlinearities of the included amplifier.

DESCRIPTION OF THE PRIOR ART

Recent advances in automatic offices industrial compounds have increased the demand for Local Area Networks (LANs). Various arrangements for LANs and for coupling to a LAN are disclosed, for example, in the article "Optical Fibers in Local Area Networks" by M. R. Finley, Jr. in *IEEE Communications Magazine*, Aug. 1984, Vol. 22, No. 8 at pages 22-35. As shown in the Finley, Jr. article, such arrangements generally use passive couplers as interfaces to introduce and extract information from the optical fiber medium. Amplifiers are also used at various points in the network, such as, for example, at each user's transmitter and receiver or in a head-end station.

Various methods have also been used to permit the multiple users of a LAN to access the common optical transmission medium, such as by using Frequency Division Multiplexing (FDM), Time Division Multiplexing (TDM), etc. In U.S. Pat. Nos. 3,809,815 and 3,809,816, issued to J. Reedy et a) on May 7, 1974, a system is disclosed using FDM for providing communications between a plurality of stations over a common transmission medium. Each station (a) is assigned a fixed home frequency at which it transmits information, (b) is operated from a single reference frequency, and (c) includes a synthesizer. When calling another station, the synthesizer within the calling station adjusts its transmit frequency to correspond to the receive frequency of the called station, which automatically adjusts the receive frequency of the called station.

An important problem with optical LANs is the excessive signal loss incurred when multiple users tap into or out of a fiber bus. Ideal (linear) optical amplifiers could solve this problem, but in practice amplifier non-linearities lead to excessive cross-talk among users. The problem remaining in the prior art is to provide an LAN arrangement which substantially eliminates excessive signal loss at the couplers and substantially avoids excessive cross-talk from amplifier non-linearities.

SUMMARY OF THE INVENTION

The foregoing problem in the prior art has been solved in accordance with the present invention which relates to an optical LAN wherein a common optical carrier is transmitted over the optical bus from a point in the network, and each user of the network impresses the data signal to be transmitted over the optical bus onto the common optical carrier propagating along the optical bus using either subcarrier angle modulation (phase or frequency modulation) or TDM techniques for intensity or angle modulation.

It is an aspect of the present invention to provide an optical LAN Wherein one carrier frequency source, Which source can be an optical or radio carrier source, is shared by a cascade of users to solve the problem of excessive signal loss when multiple users tap into or out of a fiber bus by permitting the liberal use of amplifiers along the bus of the network while avoiding cross-talk from amplifier non-linearities.

Other and further aspects of the present invention will become apparent during the course of the following description and by reference to the accompanying drawings.

BRIEF DESCRIPTION OF THE DRAWINGS

Referring now to the drawings in which like numerals represent like elements in the several views.

DETAILED DESCRIPTION

Figure 1:
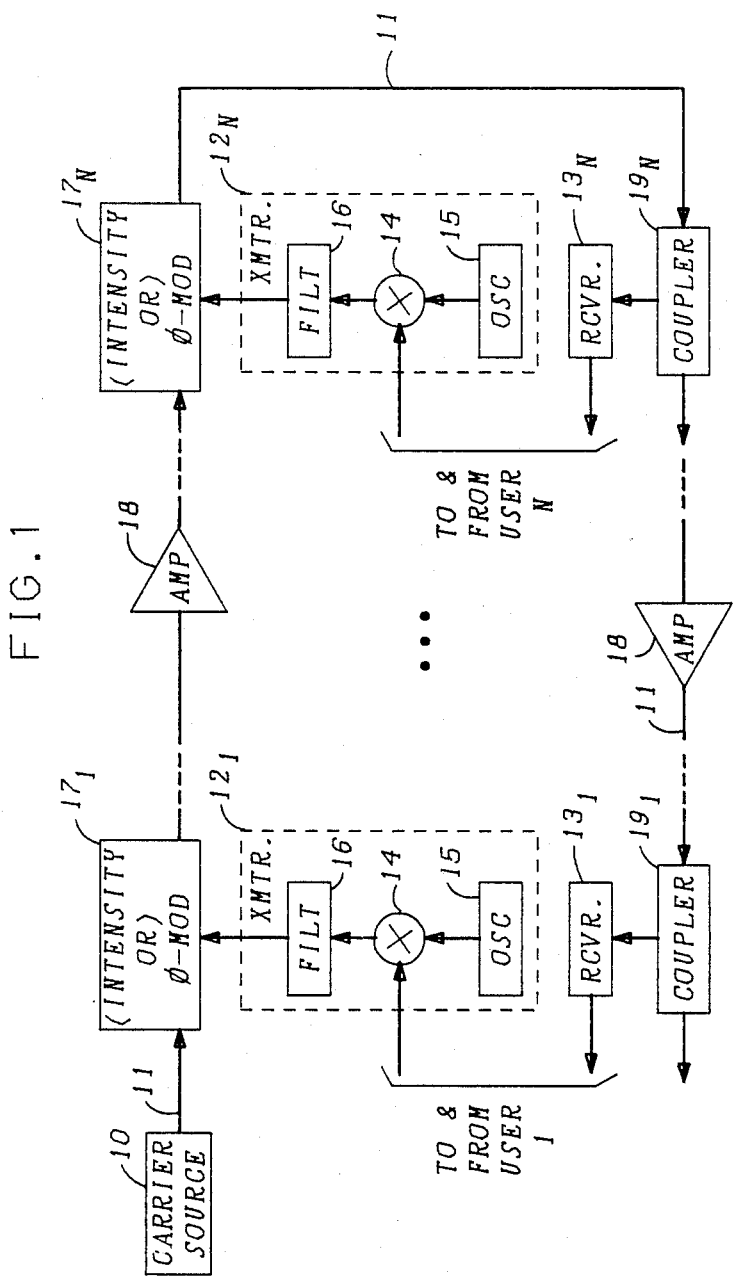
FIG. 1 is a block diagram of an exemplary optical Local Area Network (LAN) in accordance with the present invention.

FIG. 1 is a block diagram of a communication system in accordance with the present invention wherein the system uses a single carrier onto which each user of the system impresses its data using either subcarrier angle modulation, i.e., phase or frequency modulation or Time Division Multiplexing (TDM) techniques. More particularly, in the present system, a carrier source 10 launches its carrier output signal onto the head-end of a transmission medium 11. For purposes of discussion hereinafter, and not for purposes of limitation, it will be assumed that carrier source 10 is an optical carrier source, such as a laser or Light Emitting Diode (LED), and that transmission medium 11 is an optical waveguide. It is to be understood that carrier source 10 could take the alternative form of an electrical carrier signal source and that transmission medium 11 could then be, for example, a coaxial cable or other electrical or radio signal propagating medium.

As shown in FIG. 1, users 1-N of the system are associated with both transmitters $12_1$ to $12_N$, respectively, and respective receivers $13_1$ to $13_N$. It is to be understood that a user can comprise a plurality of stations which have their signals multiplexed within a single channel before transmission to the associated transmitter 12 and receiver 13. However, in the description of the present invention which follows, it will be assumed that each station is associated with a separate transmitter and receiver. Each of transmitters $12_1$ to $12_N$ is shown as including a mixer or up-converter 14 and an oscillator or subcarrier source 15, and a band pass filter 16. In the transmitter $12_i$, information signals received from the associated user are mixed in mixer 14 with the subcarrier frequency generated by oscillator 15 to convert the user's input signal to a desired frequency band as the transmitter's output signal. Filter 16 functions to pass only the desired output frequency band and block all other frequencies.

The transmitter output signal from, for example, transmitter $12_1$ is then angle modulated onto the carrier from carrier source 10 propagating on transmission medium 11 by a separate associated phase modulator $17_1$, and the resultant signal from phase modulator $17_1$ propagates through each of the other phase modulators $17_2$ to $17_N$ wherein other signals from transmitters $12_2$ to $12_N$, respectively, are angle modulated onto that same carrier signal from carrier source 10. Amplifiers 18 are shown disposed along optical waveguide 11 for amplifying the optical signal in optical transmission medium 11 whenever necessary.

Figure 2:
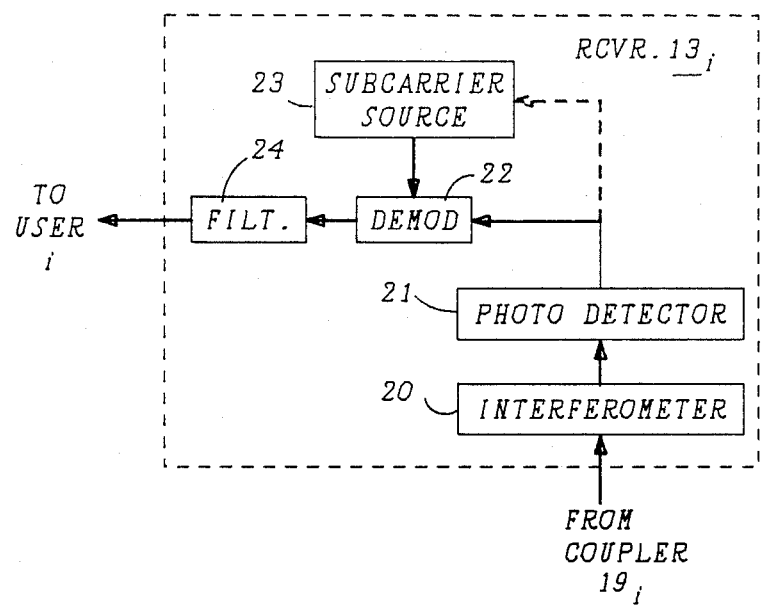
FIG. 2 is a block diagram of an exemplary receiver for use in the network of FIG. 1 using subcarrier angle modulation.

At each of receivers $13_1$ to $13_N$ associated with users 1-N, respectively, the subcarrier multiplexed signals from transmitters $12_1$ to $12_N$ are received via respective couplers $19_1$ to $19_N$. Each of receivers $13_1$ to $13_N$ functions to detect the signal destined for it and to appropriately demodulate this signal for transmission to the associated user. Receiver $13_i$ might use coherent techniques to recover the associated user's signal from the received signal, or, as shown in FIG. 2, the receiver might use high-Q optical components, such as an interferometer 20, to convert the angle-modulated received signal into an intensity modulated signal and then use a photodetector 21 to convert the optical signal to an electrical signal. After detection, radio circuitry such as a demodulator 22 and a subcarrier source 23 could be used to appropriately demodulate the received signal to the desired frequency band. A filter 24 can then be used to pick out the desired subcarrier signal destined for transmission to the associated user. Such techniques are well-known in the art. In any case it is to be understood that any suitable arrangement can be used for transmitters 12 or receivers 13 for practicing the present invention as described.

The general operation described above can be implemented in a variety of ways. One way is that each of oscillators 15 in transmitters $12_1$ to $12_N$ generates a subcarrier frequency which is fixedly assigned to each oscillator 15 and is different than each of the subcarrier frequencies generated by the oscillators 15 in the other transmitters 12. In such case, receivers $13_1$ to $13_N$ must each be capable of detecting the channel frequency band within the received multiplexed signal which is destined for the associated user and for then appropriately demodulating such channel for transmission to the user. More particularly, if, for example, users 1 and N desire to transmit to users N and 1, respectively, then transmitter $12_1$ receives the signal to be transmitted from user 1 to user N and mixes this signal with the fixedly assigned subcarrier frequency $f_1$ generated by oscillator 15 and transmits the resultant signal to phase modulator $17_1$ via filter 16. At phase modulator $17_1$, the subcarrier channel is angle modulated onto the carrier from carrier source 10 for propagation along optical transmission medium 11. Similarly, transmitter $12_N$ receives the information signal to be transmitted from user N to user 1 and mixes this signal with the fixedly assigned subcarrier frequency $f_N$ generated by oscillator 15 and transmits the resultant signal to phase modulator $17_N$ via filter 16. At phase modulator $17_N$ the subcarrier channel from user N is angle modulated onto the carrier from carrier source 10 for propagation along optical transmission medium 11. Therefore, on transmission medium 11 after phase modulator $17_N$, each of the channel signals from users 1-N will comprise a different phase or frequency relative to the carrier frequency from carrier source 10.

At receiver $13_N$, a portion of the angle modulated signals propagating along transmission medium 11 is coupled out by coupler $19_N$ for delivery to receiver $13_N$. The portion of the coupled out signal received by receiver $13_N$ is detected in the receiver's photo detector 21 and demodulated in demodulator 22 using a subcarrier frequency corresponding to the subcarrier frequency generated by oscillator 15 of transmitter $12_1$ to recover the signal originally transmitted by that transmitter. Similarly, at receiver $13_1$, a portion of the angle modulated signals propagating along transmission medium 11 are coupled out by coupler $19_1$ for delivery to receiver $13_1$. The portion of the coupled out signal received by receiver $13_1$ is detected in its exemplary photo detector 21 and demodulated in demodulator 22 using a subcarrier frequency corresponding to the subcarrier frequency generated by oscillator 15 of transmitter $12_N$ to recover the signal originally transmitted by that transmitter. It is to be understood that any suitable technique known in the art can be used for initially setting up, without collision, and continuing communications between two users. For example, such techniques can include a separate signaling channel with or without a head-end station (not shown), or a scanning arrangement (not shown) at an idle receiver for detecting that receiver's address and locking onto the originating transmitter's subcarrier frequency by subcarrier source 23 when called.

A second way that the system can operate is that each of the subcarrier sources 23 in receivers $13_1$ to $13_N$ generates a subcarrier frequency which is fixedly assigned to the associated receiver $13_i$ and is different than the subcarrier frequency assigned to each of the other receivers 13. In such case, transmitters $12_1$ to $12_N$ must be capable of transmitting its information signal in the channel frequency band which has been fixedly assigned to the receiver of the destined user. More particularly, each transmitter 12 must include an oscillator source 15 which is tunable to any of the N channels fixedly assigned to the receivers $13_1$ to $13_N$ to permit any user to communicate with any other user of the system. For example, if user 1 wishes to communicate with user N in a two-way communication, then the oscillator 15 in transmitter $12_1$ is tuned to generate the subcarrier frequency $f_N$ assigned to and recognized by receiver $13_N$, and oscillator 15 in transmitter $12_N$ is tuned to generate the subcarrier frequency $f_1$ assigned to, and recognized by, receiver $13_1$. In this manner transmitters $12_1$ and $12_N$ communicate directly with receivers $13_N$ and $13_1$, respectively. A third way would be for each of the transmitters $12_i$ and receivers $13_i$ being free to selectively generate an appropriate subcarrier frequency for two-way communications.

Figure 3:
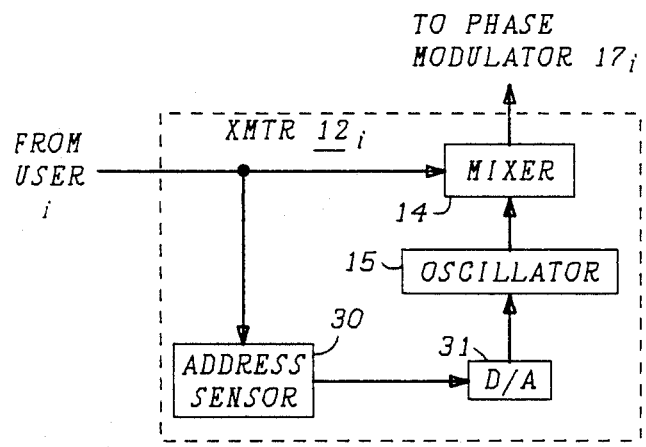
FIG. 3 is an exemplary block diagram of a transmitter for use in the network of FIG. 1 when receivers of the network are each assigned with a separate subcarrier frequency.

This technique can be easily accomplished by the oscillator 15 in each transmitter 12 being informed of the desired destination user's address in, for example, the preamble of a packet, as shown in FIG. 3, or by a separate control signal at the start of communications with another user as is well known in the art. Additionally, well known initialization collision detection techniques or centralized control can be used to avoid simultaneous transmissions to a single user. As shown in FIG. 3, a signal from a user i enters the associated transmitter $12_i$ and is directed to both oscillator 15 and an address sensor 30. Address sensor functions to detect the address of the destined user transmitted, for example, in the preamble of a packet or separately in a control signal, and for providing a digital output signal representative of such address. A digital-to-analog converter 31 converts the output signal from address sensor 30 into an analog control signal which adjusts oscillator 15 to generate the subcarrier signal, at its output, assigned to the destined user's receiver 13.

Figure 4:
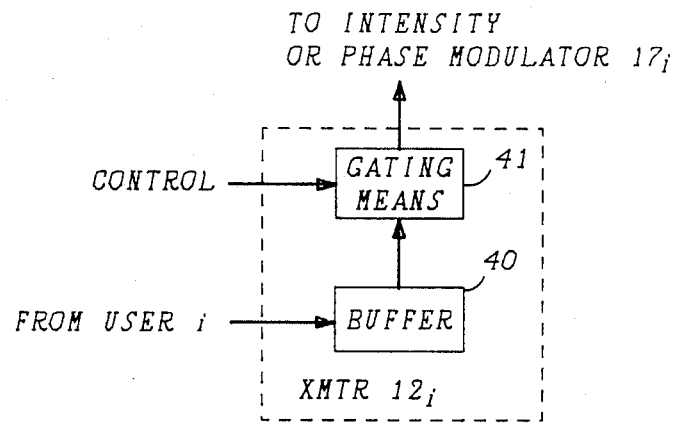
FIG. 4 is an exemplary block diagram of a transmitter for use in the network of FIG. 1 where TDM techniques are used.

The description hereinbefore for FIGS. 1-3 has been directed to the principle of the invention, which is to cascade modulators 17 along a bus 11 for impressing separate information signals onto a common carrier using a subcarrier angle modulation technique. However, as mentioned before, TDM techniques can also be used to practice the principle of the invention. Where TDM techniques are used, the data from a user can be directly impressed on the common carrier using intensity modulation or phase modulation. An exemplary transmitter $12_i$ for employing the TDM technique is shown in FIG. 4. There, the information from an associated user of transmitter $12_i$ is temporarily stored in a buffer 40. When the time slot which is assigned to the transmitter in a predetermined frame sequence arrives at modulator $17_i$, associated with transmitter $12_i$, a control signal causes a gating means 41 to direct the buffered information signal to modulator $17_i$ for insertion in the assigned time slot using intensity or phase modulation.

Figure 5:
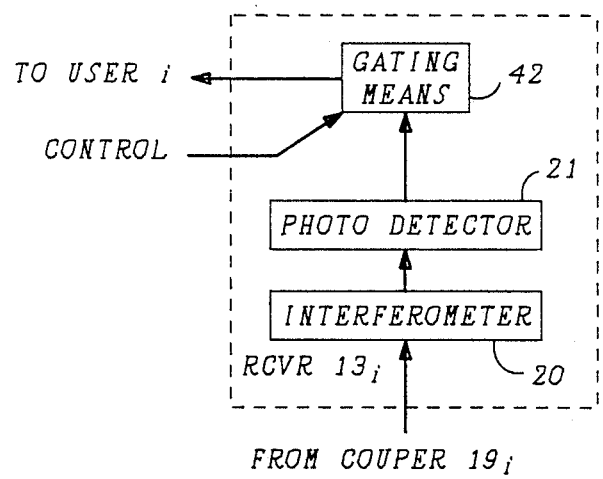
FIG. 5 is an exemplary block diagram of a receiver for use in the network of FIG. 1 when TDM techniques are used.

FIG. 5 is an exemplary block diagram of a receiver $13_i$ for use with the transmitter of FIG. 4 when the network uses TDM techniques. In receiver $13_i$, of FIG. 5, the interferometer 20 and photodetector 21 function as described previously for the corresponding elements of FIG. 2. However, a gating means 42 is responsive to a control signal for directing the information signal received during a predetermined time slot period to the associated user of receiver $13_i$. More particularly, if as in the prior example, transmitter $12_1$ wants to communicate with receiver $13_N$, then transmitter $12_1$ inserts the information signal going to receiver $13_N$ in, for example, an assigned time slot 5 of a frame of N time slots. At receiver $13_N$, gating means 42 causes the information received during exemplary time slot period 5 to be routed to the desired end user and block all other time slot information signals which are not directed to a user of receiver $13_N$. It is to be understood that the control signals for enabling gating means 41 and 42 can be generated by any suitable arrangement, such as, for example, a central control for the network which maintains the dynamic time slot assignments and provides the appropriate control signals to the transmitters and receivers, or a suitable arrangement within each transmitter and receiver which are known in the art.

It is to be understood that the above-described embodiments are simply illustrative of the principles of the present invention. Various other modifications and changes may be made by those skilled in the art which will embody the spirit and scope thereof. For example, other techniques can be used in either the transmitters 12 or receivers 13 for implementing the communication between two users by impressing the signals onto a common carrier propagating on transmission medium 11. Such other techniques can comprise intensity modulation rather than angle modulation for TDM techniques and multiple system transmissions where each system operates at a different optical wavelength. Advantages of the present invention are that each amplifier 18 sees a constant envelope signal and, therefore, no intermodulation distortion is produced by the amplifiers. Thus, amplifiers can be used to compensate for signal loss associated with multiple user taps into and out of a fiber bus.

What is claimed is:

1. A multi-user communication system comprising:
   means for generating a continuous predetermined carrier output signal;
   a transmission medium for propagating therealong the predetermined continuous carrier output signal from the generating means;
   a plurality of N transmitters, each transmitter being disposed remote from the generating means and between the transmission medium and a separate user of the system and comprising means for gating information signals representative of information signals received from the associated separate user as a transmitter output information signal during a predetermined time period corresponding to an arrival time of a predetermined free time slot of a Time Division Multiplex sequence on the transmission medium; and
   a plurality of N modulating means, each modulating means being associated with a separate one of the plurality of N transmitters and disposed at a separate point along the transmission medium for directly modulating the output information signal from the associated transmitter onto the carrier output signal propagating along the transmission medium from the generating means.

2. A multi-user communication system according to claim 1 wherein the predetermined free time slot for each of the plurality of transmitters comprises a separate fixedly assigned time slot of the TDM sequence.

3. A multi-user communication system according to claim 1 wherein the predetermined free time slot is selectively assigned from a plurality of time slots of the TDM sequence.

4. A multi-user communication system according to claim 1 wherein each modulating means modulates the phase of the continuous carrier output signal from the generating means with the output information signal from the associated transmitter.

5. A multi-user communication system according to claim 1 wherein each modulating means modulates the intensity of the continuous carrier output signal from the generating means with the output information signal from the associated transmitter.

6. A multi-user communication system according to claim 1 wherein the system further comprises:
   a plurality of N receivers, each receiver being disposed between the transmission medium and a separate user of the system and comprising,
   means for receiving the signals propagating along the transmission medium and for directing a received signal from the transmission medium, and destined for an associated separate user, to that user.

7. A multi-user communication system according to claim 6 wherein the receiving and directing means of each of the plurality of receivers comprises:
   means for demodulating the received signals with a predetermined subcarrier frequency which corresponds to the subcarrier frequency used by a transmitter communicating with the receiver.

8. A multi-user communication system according to claim 7 wherein the predetermined subcarrier frequency used by each of the plurality of N transmitters is a fixed assigned subcarrier frequency, which is both different for each transmitter, and is mixed with the information signal from the associated user; and the predetermined subcarrier frequency used by each of the plurality of N receivers is selectively chosen to correspond to fixedly assigned subcarrier frequency of the transmitter desiring to communicate with the receiver.

9. A multi-user communication system according to claim 7 wherein the predetermined subcarrier frequency used by each of the plurality of N receivers is a fixed assigned subcarrier frequency, which is different for each receiver, for demodulating the received signal; and the predetermined subcarrier frequency used by each of the plurality of N transmitters is selectively chosen to correspond to the fixedly assigned subcarrier frequency used by the receiver with which the transmitter desires to communicate.

10. A multi-user communication system according to claim 7 wherein the predetermined subcarrier frequency used by each of the plurality of transmitters and receivers is selectively chosen to permit separate concurrent communications between desired transmitters and receivers.

11. A multi-user communication system according to claim 6 wherein each of the plurality of receivers further comprises:

means for gating an information signal destined for the associated separate user and received from the transmission medium during a predetermined time slot period of a TDM sequence to that user while blocking all other signals.

* * * * *